United States Patent [19]
Miyazaki et al.

[11] Patent Number: 5,790,396
[45] Date of Patent: Aug. 4, 1998

[54] NEUTRAL POINT CLAMPED (NPC) INVERTER CONTROL SYSTEM

[75] Inventors: Satoshi Miyazaki, Saitama-ken; Shinji Tatara; Kosaku Ichikawa, both of Tokyo, all of Japan

[73] Assignee: Kabushiki Kaisha Toshiba, Kawasaki, Japan

[21] Appl. No.: 766,476

[22] Filed: Dec. 12, 1996

[30] Foreign Application Priority Data

| Dec. 19, 1995 | [JP] | Japan | 7-329990 |
| Dec. 25, 1995 | [JP] | Japan | 7-336251 |
| Feb. 9, 1996 | [JP] | Japan | 8-023793 |

[51] Int. Cl.$^6$ .................. H02H 7/122
[52] U.S. Cl. ........... 363/96; 363/58; 363/41; 363/65; 363/98
[58] Field of Search ............ 363/41, 58, 37, 363/96, 98, 137, 65

[56] References Cited

U.S. PATENT DOCUMENTS

| 5,274,542 | 12/1993 | Tanaka et al. | 363/96 |
| 5,361,197 | 11/1994 | Miyazaki et al. | 363/98 |
| 5,502,633 | 3/1996 | Miyazaki et al. | 363/98 |
| 5,514,944 | 5/1996 | Miyazaki | 318/800 |
| 5,621,628 | 4/1997 | Miyazaki et al. | 363/37 |

*Primary Examiner*—Robert Nappi
*Assistant Examiner*—Shawn Riley
*Attorney, Agent, or Firm*—Oblon, Spivak, McClelland, Maier & Neustadt, P.C.

[57] ABSTRACT

A neutral point clamped (NPC) inverter control system including a DC power source to output DC voltage having a neutral point, an NPC inverter to convert the DC voltage into AC voltage in three phases through a PWM control, a mode selecting unit to decide a first and a second PWM modes by comparing amplitude of voltage reference with a prescribed value that is defined by a minimum pulse width, a first voltage reference conversion means to add a prescribed bias value at which a polarity changes to positive/ negative within a fixed period to secure the minimum pulse width to voltage references in respective phases in a first PWM mode, a second voltage reference conversion means to fix the voltage reference in one phase by a value that secures the minimum pulse width when voltage reference in one phase is smaller than a prescribed value that is defined by the minimum pulse width in a second PWM mode and correct voltage references of other two phases so as to make line voltage to a value corresponding to the voltage reference, and a modulation frequency change-over means to lower PWM control modulation frequency in the first PWM mode and to suppress power loss caused by switching in the first PWM mode.

8 Claims, 12 Drawing Sheets

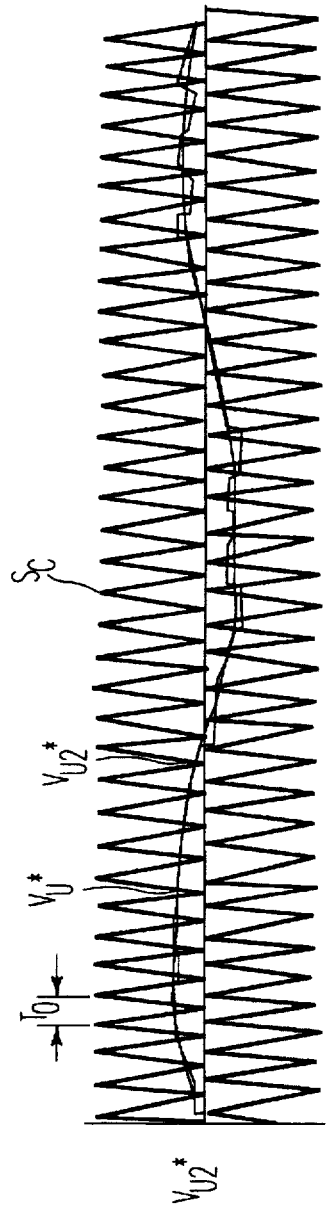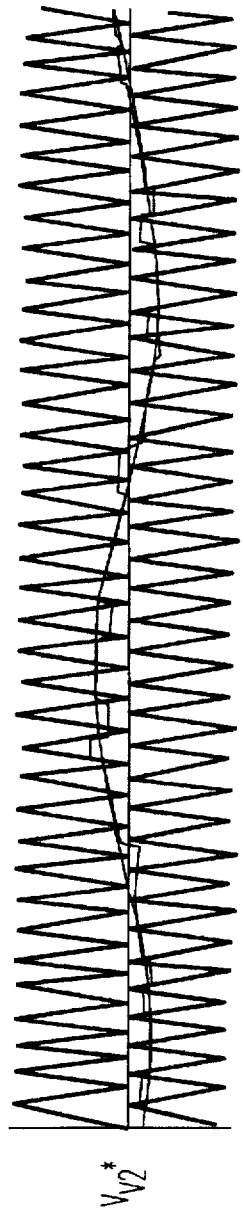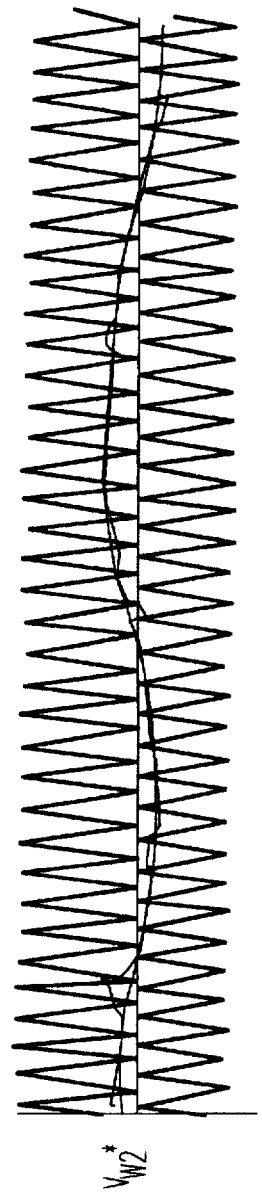

NEUTRAL POINT CLAMPED (NPC) INVERTER CONTROL SYSTEM

BACKGROUND OF THE INVENTION

1. Field of the Invention

The present invention relates to a Neutral Point Clamped (NPC) inverter control system to convert DC voltage having neutral point potential into AC voltage using the PWM control and more particularly to an NPC inverter control system with the improved control characteristic by suppressing the fluctuation of neutral point potential.

2. Description of the Related Art

A neutral point clamped (NPC) inverter is to convert DC voltage having neutral point into AC voltage, and various systems are so far developed and put to practical use. As disclosed in the Japanese Patent Application (TOKU-KAI-HEI) No. 5-268773 as a pulse width modulation control method of this type of NPC inverter, this applicant proposed a PWM inverter control method without uncontrollable region which secures the minimum pulse width of output voltage of ;n NPC inverter and outputs smooth sine wave voltage in a full output voltage region of line voltage.

The outline of the control method laid open in the patent journal described above is shown in FIG. 10 and its essential points will be briefly described. A DC power source 1 outputs DC voltage having a neutral point C between terminals P and N, capacitors 2 and 3 are connected between terminals P–C and C–N and smoothed DC voltage is output. The DC voltage having this neutral point C is input to an NPC inverter 4 and is converted into AC voltage through the pulse width modulation (PWM) by a gate pulse Gp that is output from a comparator 16, and is supplied to a motor 5.

The outline of the PWM control will be described in the following. A control unit 9 computes and outputs reactive (d axis) voltage reference Vd*, active (q axis) voltage reference Vq* and phase reference $\theta 1$ of primary voltage vector from speed reference $\omega r^*$, a rotational angle $\theta r$ of motor detected through a rotational angle detector 6, a detected value of motor speed $\omega r$ obtained through a differential unit 8 and a motor current Im detected by a current detector 7. A coordinate conversion unit 10 outputs voltage references Vu*, Vv*, Vw* in three phases based on $\theta 1$, Vd*, vq*. An arithmetic unit 11 obtains a vector sum (an amplitude of primary voltage reference) of Vd* and Vq* and outputs it as an amplitude V1* of voltage reference. A mode selecting unit 12 compares the voltage reference amplitude V1* with a prescribed threshold value Vix defined by the minimum pulse width and outputs the mode signal M PWN of 0 if V1* ≧ V1x and the mode signal M Pwm of 1 if V1*<V1x and these mode signals are input to a conversion means selecting unit 18. The conversion means selecting unit 18 operates a first voltage reference conversion means 14 if the mode signal M PWM is 1 and operates a second voltage reference conversion means 13 if the mode signal M PWM is 0, and converts three phase voltage references Vu*, Vv*, Vw* output from the coordinate conversion unit 10 into other three phase voltage reference Vu2*, Vv2*, Vw2* based on the conversion standard described in the following.

The first voltage reference conversion means 14 converts three phase voltage references Vu*, Vv*, Vw* into Vu2*, Vv2*, Vw2* based on the following equations according to polarity change-over frequency Fpn that is given by a polarity change-over frequency setting unit 12a.

Equations 1

$Vu2^* = Vu^* \pm Vb$ $Vv2^* = Vv^* \pm Vb$ $Vw2^* = Vw^* \pm Vb$ where, ±Vb is set up at least more than 2 times of a prescribed value defined according to the minimum pulse width and is a predetermined bias value given in positive/negative polarity based on a fixed polarity change-over frequency Fpn that is given by the polarity change-over frequency generator 14a.

The second voltage reference conversion means 13 converts three phase voltage references Vu*, Vv*, Vw* into Vu2*, Vv2*, Vw2* based on the following equations:

If U-phase voltage reference Vu* is 0<Vu*<Vmin:
Equations 2

$Vu2^* = Vmin$ $Vv2^* = Vv^* - Vu^* + Vmin$ $Vw2^* = Vw^* - Vu^* + Vmin$

If U-phase voltage reference Vu* is −Vmin<Vu*<0:
Equations 3

$Vu2^* = -Vmin$ $Vv2^* = Vv^* - Vu^* - Vmin$ $Vv2^* = Vw^* - Vu^* - Vmin$ where Vmin is a predetermined voltage defined according to the minimum pulse width.

If either V-phase voltage reference Vv* or W-phase voltage reference Vw* is −Vmin<V*<0, it is also converted likewise the above conversion equation.

When three phase voltage references Vu*, Vv*. Vw* are all V*<−min or Vmin<V*, the three phase voltage references are directly output as they are as shown by the following equations:
Equations 4

$Vu2^* = Vu^*$ $Vv2^* = Vv^*$ $Vw2^* = Vw^*$

The voltage references Vu2*, Vv2*, Vw2* converted as described above are input to the comparator 16 together with a triangular wave carrier Sc that is given from the carrier generator 15 and based on its size, gate pulse Gp is output to perform the pulse width modulation and thus, NPC inverter 4 is PWM controlled.

Accordingly, if the voltage reference amplitude V1* is smaller than a threshold value V1x, the predetermined bias is added to or subtracted from voltage references in respective phases by first voltage reference conversion means14 and NPC inverter 4 outputs line voltages near a zero-crossing corresponding to the voltage references Vu*, Vv*, Vw* while assuring the minimum pulse width. Further, when the amplitude of voltage reference V1* is more than the threshold value V1x, if an absolute value of the voltage reference in any one of phases is smaller than Vmin,the voltage reference in that phase is fixed at Vmin of that polarity by second voltage reference conversion means 13 and the voltage references in other two phases are corrected so that line voltage does not change, and NPC inverter 4 outputs line voltage corresponding to the voltage references Vu*, Vv*, Vw* while assuring the minimum pulse width.

An NPC inverter has to operate while maintaining the neutral point potential at a constant level but has a characteristic that it is subject to the effect of load current and neutral point potential fluctuates at frequency as high as 3 times of output frequency. This fluctuation of the neutral point potential is attributable to the fact that a period when two phases of voltage reference given in sine wave become positive and a period when it becomes negative are taken place 3 times alternately in one cycle. That is, when two phases are positive, load currents in these two phases flow from the positive side P of DC power source 1 to neutral point C and when they are negative, the load currents flow to the negative side N of DC power source 1 from neutral point C and thus, the neutral point potential fluctuates. Quantity of this fluctuation of neutral point potential increases with the increase of load current and decreases according to the increase of frequency.

When first voltage reference conversion means 14 is selected, polarities of voltage references of all phases are changed over to positive/negative pole by polarity change-over frequency Fpn and therefore, switching frequency will increase at a rate of once per one cycle of change-over cycle. Further, as polarities of all three phase voltage references become uniform, fluctuating frequency of neutral point potential does not become 3 times of output frequency but becomes equal to polarity change-over frequency Fpn. Accordingly, if Fpn is increased, an effect to suppress fluctuation of neutral point potential is obtained. However, there is such a problem that when polarity change-over frequency Fpn increases, switching frequency increases and power loss due to switching also increases. In addition, there was also such a problem that when amplitude V1* of voltage reference is near threshold value V1x, the change-over between first and second voltage reference conversion means 14 and 13 is taken place frequently and as a result, switching frequency increases.

Another type of conventional NPC inverter system is shown in FIG. 11. In this figure, a DC power source 20 is connected in series with a converter 20c to get positive side DC voltage Vdp from an AC power source 20a and a converter 20d to get negative side DC voltage Vdn from an AC power source 20b, and outputs smoothed DC voltage Vdpn (=Vdp+Vdn) between PN through an LC filter that is composed of reactors 20e, 20f and capacitors 21,22. This DC voltage Vdpn having a neutral point C is converted into desired AC voltage by an NPC inverter 23 and supplied to load 25 as three-phase AC currents Iu, Iv, Iw. These three-phase AC currents Iu, Iv, Iw are detected as feedback currents Iuf, Ivf, Iwf by a current transformer 24 and converted into orthogonal coordinate signals of active current component Iqf and reactive current component Idf in a conversion unit (three-phase to two-phase conversion) 26. This active current component Iqf and reactive current component Idf are compared with the active current reference Iqr and the reactive current reference Idr, respectively in a current controller 27 and orthogonal coordinate signals of active voltage reference Eqr and reactive voltage reference Edr are output so as to reduce respective current deviations. These orthogonal coordinate signals Eqr, Edr are converted into three-phase AC voltage references Vu*, Vv*, Vw* in a converter (two-phase to three-phase conversion) 28. In a comparator 30, these three-phase AC voltage references Vu*, Vv*, Vw* are compared with positive and negative side carriers that are output from a carrier generator 29 and output as gate pulse GP. Inverter 23 is pulse width modulation (PWM) controlled by this gate pulse GP, so that DC voltages Vdpn between PN are converted to AC voltages corresponding to the AC voltage references Vu*, Vv*, Vw*, and the active current component and the reactive current component of the three-phase AC currents Iu, Iv, Iw are controlled to become values corresponding to the active current reference Iqr and the reactive current reference Idr.

Further, the positive and negative side DC voltages Vdp, Vdn are detected as voltage feedback Vdpf, Vdnf by voltage detectors 31, 32, its differential voltage $\Delta Vd$ is added to AC voltage references Vu*, Vv*, Vw* and AC output voltage of inverter 23 is so controlled that this differential voltage is made zero by the corrected AC voltage references Vu2*, Vv2*, Vw2*. As a result, if a difference is generated between the positive and negative side DC voltages Vdp, Vdn of DC power source 20, the neutral point potential fluctuates to generate a differential voltage $\Delta Vd$ and the AC voltage references Vu2*, Vv2*, Vw2* that are the corrected AC voltage references Vu*, Vv*, Vw*, are given to a comparator 30 so as to make the differential voltage $\Delta Vd$ zero. Thus, NPC inverter 23 is so controlled that a difference is generated between the positive and negative side powers to suppress fluctuation of the neutral point potential.

If, for instance, the positive side DC voltage Vdp becomes larger than the negative side DC voltage Vdn, the differential voltage $\Delta Vd$ is added to bias the AC voltage references Vu*, Vv*, Vw* in the positive direction, it is so corrected and controlled that power supplied from the positive side DC voltage Vdp increases and power supplied from the negative side DC voltage Vdn decreases and as a result, the fluctuation of the neutral point potential is suppressed.

However, on a conventional NPC converter system described above, DC voltage may be oscillated by resonance frequency of an LC filter, that is composed of reactors 20e, 20f and capacitors 21, 22, resulting from fluctuation in loads and/or output frequency. Converters 20c and 20d are equipped with a voltage control system (not shown), respectively, for controlling DC voltage and DC voltage may oscillate in connection with the voltage control response and the resonance frequency. Further, as the differential voltage $\Delta Vd$ is not detected if positive current voltage Vdp and negative current voltage Vdn fluctuate while they are in accord with each other, the fluctuation of DC voltage cannot be suppressed by the correction control described above. Further, if positive side DC voltage Vdp and negative side DC voltage Vdn fluctuate in the same phase by the fluctuation of the active current component of AC current output from inverter 23, the differential voltage $\Delta Vd$ becomes zero and therefore, the fluctuation of DC voltage cannot be suppressed.

As a result, on a conventional NPC inverter system it is inevitable to cope with fluctuation of DC voltage by delaying voltage control responses of the converters and it was not able to suppress fluctuation of DC voltage sufficiently. Therefore, when a motor to drive a rolling mill is applied as a load, a control response to fluctuation of the load becomes slow, the control output torque is fluctuated, the rolling action is influenced and the product quality may be adversely affected.

A conventional NPC inverter that is used in foregoing NPC inverter system is shown in FIG. 12. In this figure, a converter 40 obtains DC voltage from an AC power source (not shown) and outputs it via a reactor 41 and outputs DC voltage having a neutral point C smoothed by capacitors 42, 43 connected in series between P and N. There are switching elements S1–S4(Su1–Su4,Sv1–Sv4, Sw1–Sw4) composed of diodes connected in reverse parallel via fuses 44a–44f connected in series for each phase between PN, and potential at one of 3 levels of the positive pole P, negative pole N and neutral point C of DC voltage is output to respective AC output terminals U, V, W in the shape of pulse, pulse width modulated AC voltage is output and AC power of good quality is supplied to a load 45.

When switching elements S1 and S2 of the positive side arm are simultaneously turned ON, the potential of the positive pole P is output, when switching elements S3 and S4 of the negative side arm are simultaneously turned ON, the potential of the negative pole N is output, and when both switching elements S1 and S4 are turned OFF and switching elements S2 and S3 are simultaneously turned ON, the potential at neutral point C is output through either a neutral point clamped diode D1 or D2(Du1 or Du2,Dv1 or Dv2, Dw1 or Dw2). Further, when the positive AC voltage is output, switching element S2 is turned ON and switching element S1 is turned ON/OFF. When the negative AC voltage is output, switching element S3 is turned ON and switching element S4 is turned ON/OFF. Further, switching elements S1,S3 and S2, S4 are turned ON/OFF complimentarily but never turned ON simultaneously. This switching control operation is well known and therefore, its detailed explanation will be omitted.

On such an NPC inverter system, when switching element S2 is in the ON state and switching elements S1 and S3 are turned ON/OFF complimentarily to output the positive AC voltage, if switching element S1 is not turned OFF when it should be turned OFF and kept in the ON state, and switching element S3 is turned ON or switching element S1 is turned ON and switching element S3 is kept in the ON state for some reason although it should normally be turned OFF, the short-circuit current flows out of capacitor 42 through neutral point clamped diode D2. In such a case, fuse 44a (or 44c,44e)is burnt down to prevent switching elements S1–S3 from being damaged. If switching element S2 is turned ON when switching elements S3, S4 are turned ON simultaneously, the short-circuit current flows out of capacitor 43 through neutral point clamped diode D1, fuse 44b (or 44d,44f)is burnt down to prevent switching elements S2–S4 from being damaged and thus, the expansion of trouble is prevented.

Fuses for protecting an NPC inverter system from the short-circuit described above are not a little heated by the current flowing during the operation, exposed to a high temperature environment for an extended period, gradually deteriorated and tend to be easily burnt down and in order to secure reliability of protective characteristic, needed to be replaced periodically (for instance, every 1–2 years) and are therefore uneconomical. In recent years, NPC inverters in high-tension large capacity of several kV DC voltage are put to practical use with the development of semiconductor devices. As a result, high-tension protective fuses become necessary and coupled with the problem described above, an economical and highly reliable short-circuit protection without using fuse is desired.

SUMMARY OF THE INVENTION

The present invention is made in view of the problems described above and it is an object to provide a neural clamped (NPC) inverter control system capable of effectively suppressing fluctuation of neutral point potential without increasing switching frequency.

It is another object of the present invention to provide an NPC inverter control system with the improved control characteristic by correcting and controlling active current component of AC output current by detecting fluctuation of DC voltage, suppressing oscillation of DC voltage by LC resonance of a DC power source.

It is more another object of the present invention to provide an economical and highly reliable NPC inverter capable of protecting switching elements from short-circuit current without using fuses and preventing the expansion of troubles.

According to this invention there is provided an NPC inverter control system characterized in that it is equipped with a DC power source to output DC voltage having a neutral point, an NPC inverter to convert the DC voltage into AC voltage in three phases through a PWM control, a mode selecting unit to decide a first and a second PWM modes by comparing amplitude of voltage reference with a prescribed value that is defined by the minimum pulse width, a first voltage reference conversion means to add a prescribed bias value at which the polarity changes to positive/negative within a fixed period to secure the minimum pulse width to voltage references in respective phases in a first PWM mode, a second voltage reference conversion means to fix the voltage reference in one phase by a value that secures the minimum pulse width when voltage reference in one phase is smaller than a prescribed value that is defined by the minimum pulse width in a second PWM mode and correct voltage references of other two phases so as to make line voltage to a value corresponding to the voltage reference, and a modulation frequency change-over means to lower PWM control modulation frequency in the first PWM mode and to suppress power loss by the switching in the first PWM mode.

Further, according to this invention there is provided an NPC inverter control system characterized in that it is equipped with a DC power source to output DC voltage having a neutral point dividing it into positive and negative side voltages through an LC filter, NPC inverters to convert the DC voltages into AC voltages of desired frequency and supply AC current to loads, a current control means to control the NPC inverters so as to reduce current deviations by comparing active current reference and reactive current reference with detected values of active current component and reactive current. component, and a correcting means to output a fluctuating component of the DC voltage in the region above a prescribed frequency as a correction signal and correct the active current reference so as to suppress fluctuation of the DC voltage by this correction signal.

Further, according to this invention there is provided an NPC inverter characterized in that it is equipped with a DC power source which, with the connecting point of two sets of series connected capacitors used as a neutral point, outputs DC voltage, an NPC inverter unit, with the positive and negative poles of the DC power source and the neutral point connected, converts the DC voltage into AC voltage, a first and a second branch circuits each of which is a series circuit composed of a reactor and a switching element provided between the positive and negative sides of the DC power source and the neutral point, and when short-circuit current of the NPC inverter unit is detected, the switching elements of the first and the second branch circuits are turned ON, thus protecting the NPC inverter unit.

BRIEF DESCRIPTION OF THE DRAWINGS

FIG. 3 is a voltage waveform diagram for explaining the action of a first voltage reference conversion means 14 in the embodiment shown in FIG. 1;

DETAILED DESCRIPTION OF THE PREFERRED EMBODIMENTS

Figure 1:
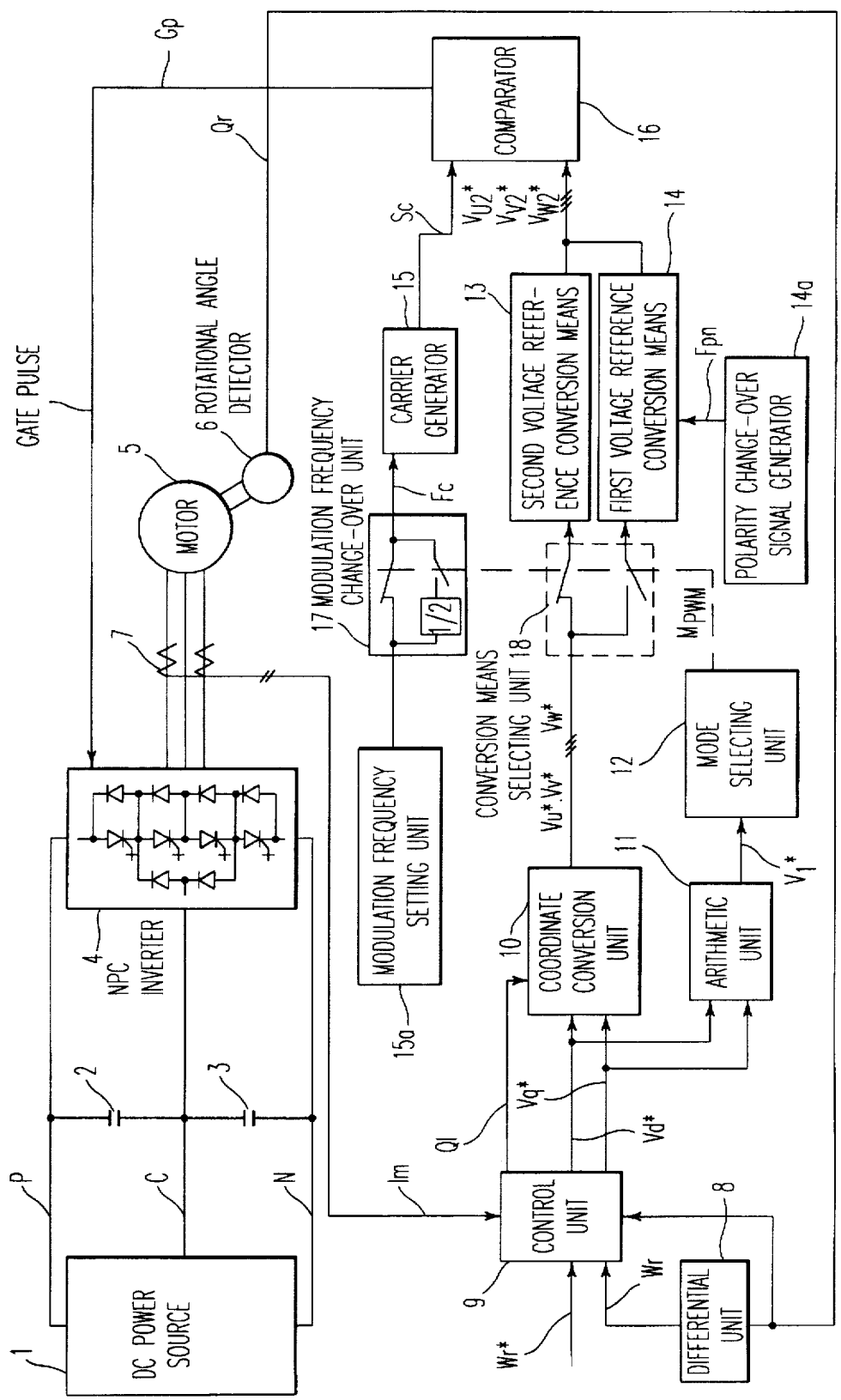
FIG. 1 is a block diagram showing an embodiment of a neutral point clamped (NPC) inverter control system of the present invention.
Figure 10:
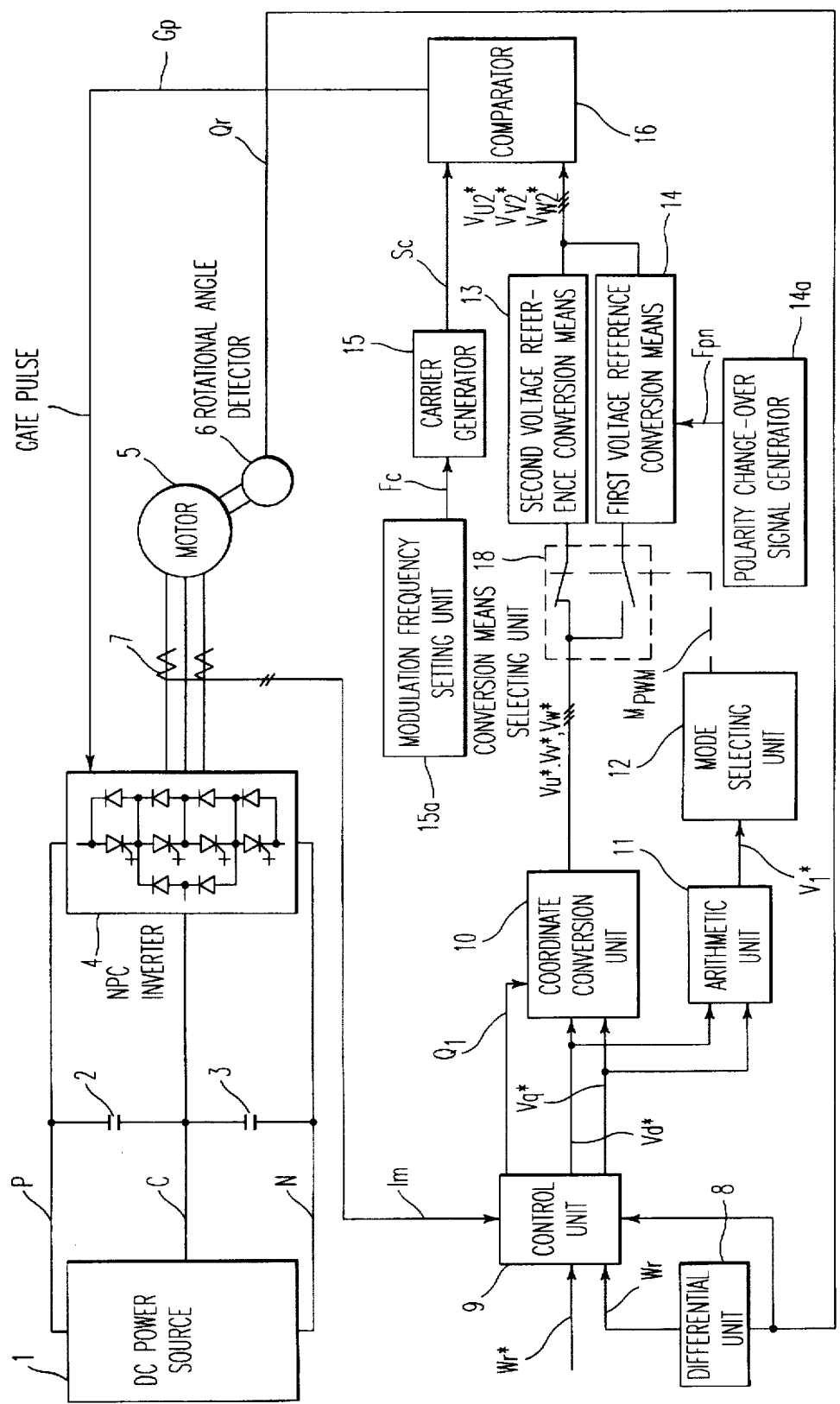
FIG. 10 is a block diagram showing a conventional NPC inverter control system.
Figure 11:
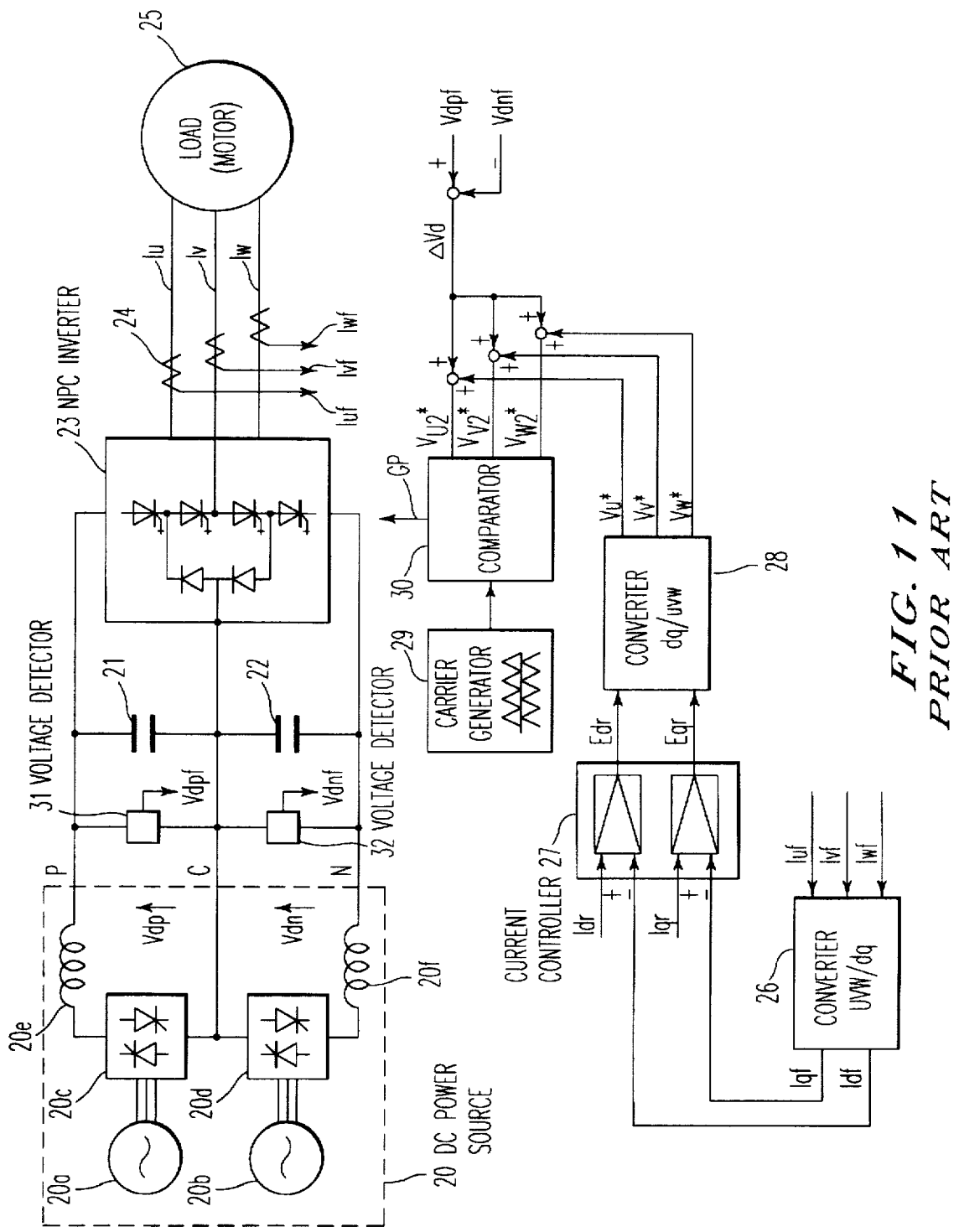
FIG. 11 is a block diagram showing an another conventional NPC inverter system.

An embodiment corresponding to a neutral point clamped inverter control (NPC) system of the present invention as claimed in claim 1 is shown in FIG. 1. In the construction shown in FIG. 1, 17 is a modulation frequency change-over means and when mode signal M PWM given from mode selecting unit 12 is 1, outputs setting frequency of carrier frequency setting unit 15 by reducing it to ½ and when mode signal M PWM is 0, outputs setting frequency of carrier frequency setting unit 15 as it is, and changes over modulation frequency Fc according to the mode signal 1/0. Carrier generator 15 generates triangular wave carrier Sc of the modulation frequency Fc that is changed over by the modulation frequency change-over means. All other elements are the same as those used in a conventional NPC inverter control system (FIG. 10).

In the construction described above, when amplitude V1* of voltage reference that is output from arithmetic unit 11 is less than prescribed threshold value V1x defined by the minimum pulse width (V1*<V1x), mode signal M PWM of 1 is output from mode selecting unit 12 and when it is more than threshold value V1x (V1*≧V1x), mode signal M PWM of 0 is output from mode selecting unit 12. When mode signal M PWM is 1, the function of first voltage reference conversion means 14 is validated by conversion means selecting unit 18 and at the same time, modulation frequency Fc is reduced to ½ of setting frequency of carrier frequency setting unit 15a. Further, when mode signal M PWM is 0, the function of second voltage reference conversion means 13 is validated and voltage references Vu*, Vv*, Vw* in respective phases that are output from coordinate conversion unit 10 are converted to Vu2*, Vv2*, Vw2*.

Figure 2A:
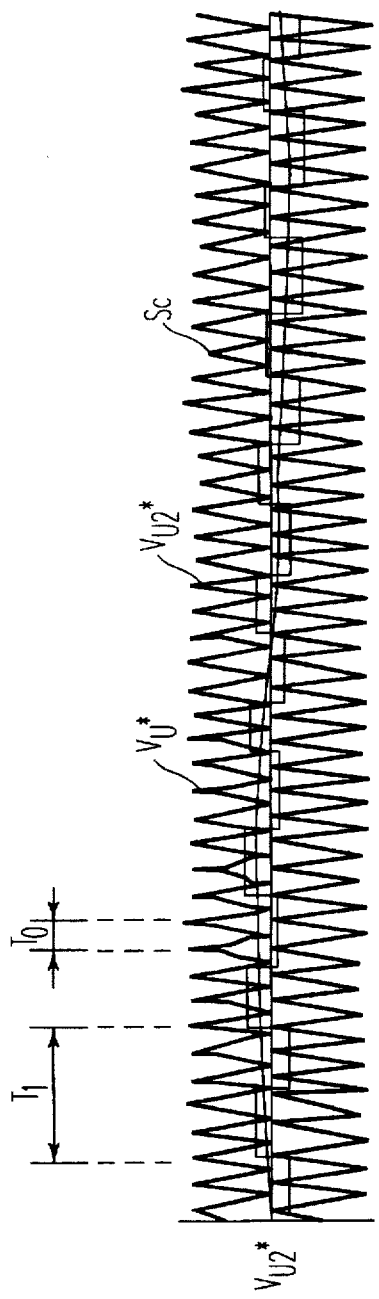
FIG. 2 is a voltage waveform diagram for explaining the action of a second voltage reference conversion means 13 in the embodiment shown in FIG. 1.
Figure 2B:
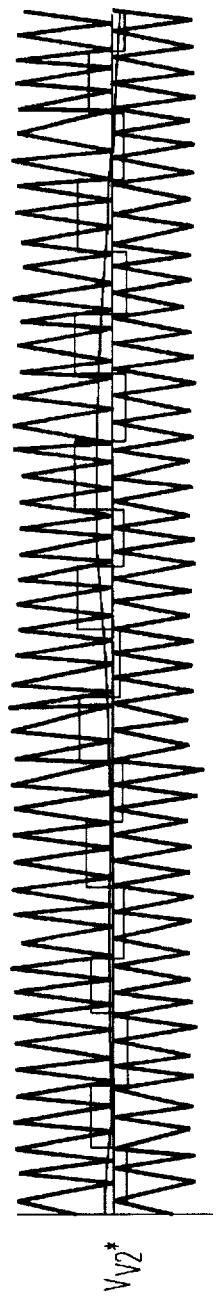
Figure 2C:
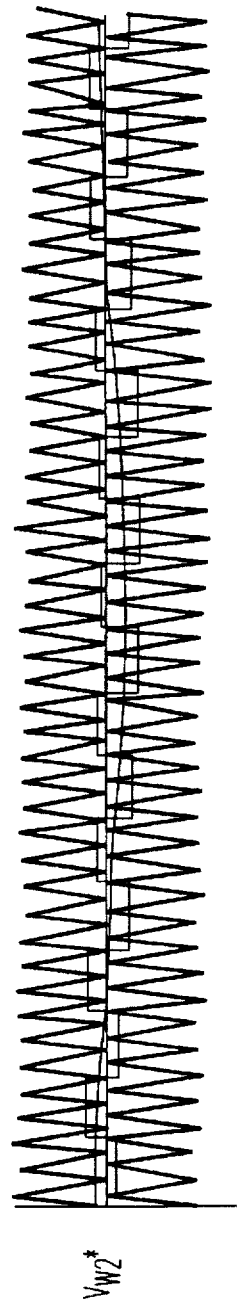

When the function of first voltage reference conversion means 14 is validated, bias voltage in square wave of a period T1 defined by polarity change-over frequency Fpn is added to voltage references in respective phases Vu*, Vv*, Vw* as shown in FIG. 2, and converted voltage references Vu2*, Vv2*, Vw2* are changed one time to positive/negative in period T1. Period T0 of carrier Sc is decided according to modulation frequency Fc and becomes 2 times of a normal modulation period. Shown in FIG. 2 is an example wherein polarity change-over frequency Fpn was set at ⅕ of modulation frequency Fc. When the function of second voltage reference conversion means 13 is validated, the period T0 of carrier Sc is changed over to the normal modulation period that is decided according to setting frequency of carrier frequency setting unit 15a and suppressed similarly as before.

In this embodiment, when mode signal M PWM is 1, a prescribed bias is added to or subtracted from voltage references as described above and NPC inverter 4 outputs smooth sine wave line voltages corresponding to voltage references Vu*, Vv*, Vw* while assuring the minimum pulse width near the zero-crossing of the voltage references. In this case, modulation frequency is reduced to ½ of the normal level and even when polarity change-over frequency Fpn is set at a large level, it becomes lower than the normal modulation frequency Fc. As output frequency is generally lower in a region wherein voltage references are low, a harmonic containing rate is also low and the control efficiency does not drop. Accordingly, even when polarity change-over frequency Fpn is set at a higher level, power loss due to switching does not become higher than a normal level and fluctuation of the neutral point potential can be efficiently suppressed.

Further, mode selecting unit 12 shown in FIG. 1 is in such structure that it has a hysteresis characteristic when changing over a mode by setting mode signal M PWM at 1 when amplitude of voltage reference V1* is less than a prescribed threshold valve V1x (V1*<V1x) that is decided according to the minimum pulse width and setting mode signal M PWM at 0 when a little value Δ V is added to V1x (V1*≧V1x+Δ V) and when the NPC inverter is operated at the amplitude of voltage reference V1* near a prescribed value V1x defined according to the minimum pulse width, and it is possible to prevent the generation of chattering and suppress increase of switching frequency resulting from the mode change-over.

According to the above mentioned present invention, it is possible to provide an NPC inverter control system capable of suppressing fluctuation of neutral point potential without increasing switching frequency in a low voltage region wherein amplitudes of voltage references are less than a prescribed value defined according to minimum pulse width.

Figure 4:
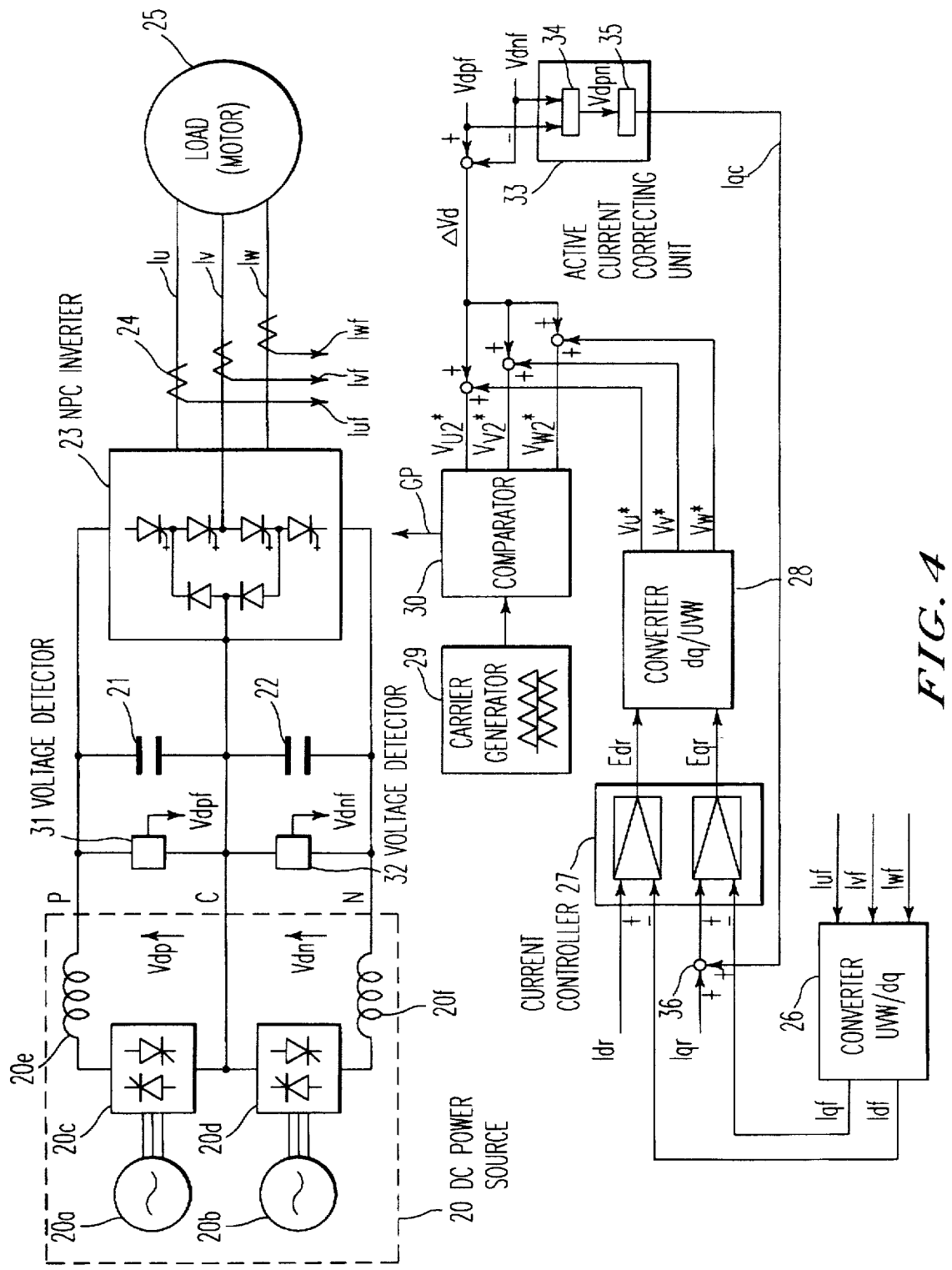
FIG. 4 is a block diagram of an embodiment of an another NPC inverter system of the present invention.

An embodiment of an another NPC inverter system of the present invention is shown in FIG. 4.

In the construction of the NPC inverter system shown in FIG. 4, 33 is an active current correction unit to get a correcting signal Iqc from the detected value of positive side DC voltage Vdpf and that of negative side DC voltage Vdnf, and is composed of an adder 34 to get an added value (Vdpf+Vdnf) of a detected value of positive side DC voltage Vdpf and that of negative side DC voltage Vdnf, that is, DC voltage Vdpn between PN of DC power source 20 and a high-pass filter 35 to output only the high-frequency region as correction signal Iqc by removing the low-frequency region including DC components below a prescribed frequency of fluctuating components when DC voltage Vdpn between PN fluctuates. 36 is an adder to add correction signal Iqc to active current reference Iqr. All others are in the same construction as in a conventional NPC inverter system.

In the construction described above, NPC inverter system 23 outputs three-phase AC currents Iu, Iv, Iw similar to a conventional inverter system based on active current reference Iqr and reactive current reference Idr and if a difference is generated between positive and negative side DC voltages Vdp and Vdn of DC power source 20 and a differential voltage ΔVd is detected, AC voltage references Vu*, Vv*, Vw* are corrected and controlled so as to suppress the neutral point potential to fluctuate likewise a conventional NPC inverter system.

Further, in this embodiment, when DC voltage Vdpr between PN of DC power source 20 fluctuates, correction signal Iqc of the high-frequency region with the low-frequency region including DC components below a prescribed frequency of the fluctuated components removed is output from active current correction unit 33 and added to active current reference Iqr via adder 36. As a result, if DC voltage Vdpn between PN fluctuates, active current components of AC currents Iu, Iv, Iw that are output from NPC inverter 23 are corrected and controlled so as to suppress the voltage fluctuation. For instance, if DC voltage Vdpn between PN changes in the increasing direction, active current components are corrected in the increasing direction and if DC voltage Vdpn changes in the decreasing direction, active current components are corrected in the decreasing direction and as a result, fluctuation of DC voltage Vdpn is suppressed.

Figure 5A:
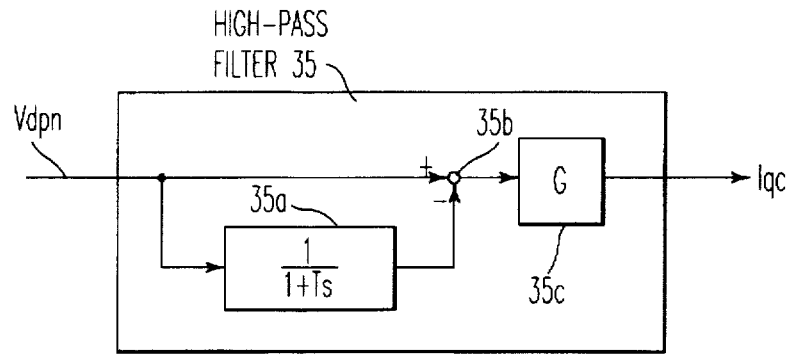
FIG. 5(a) is a block diagram showing the characteristic of a high-pass filter; (b) is a block diagram of the essential portions of an embodiment of an NPC inverter system of the present invention; (c) is a diagram showing the gain characteristic of arithmetic units.

Shown in FIG. 5(a) is a transfer function showing the characteristic of high-pass filter 35, a 35a is a transfer block to pass only a low-frequency region including DC components below a frequency determined by a prescribed time constant T of input signal, 35b is a subtracter to subtract the low-frequency region of the input signal passed through transfer block 35a, 35c is an amplifier to convert the output signal of subtracter 35b to a prescribed level and output as correction signal Iqc. From the construction described above, only high-frequency components with the low-frequency region including DC components below a frequency that is determined by prescribed time constant T removed from input signal Vdpn (a detected value of DC voltage Vdpn between PN) is output as correction signal Iqc.

According to this embodiment, when DC voltage fluctuates while resonating the resonance frequency of LC filter of DC power source 20 resulting from fluctuation of loads/output frequency, it is possible to get a dumping effect to effectively suppress DC voltage fluctuation by properly setting a time constant T of high-pass filter 35a and improve a voltage control response of a converter operating as a DC power source without generating an oscillation phenomenon. Accordingly, when a motor to drive a rolling mill is applied as a load, fluctuations of the control output torque of the motor as well as an effect given to the rolling action are suppressed and such a problem that product quality is adversely affected is solved.

Figure 6:
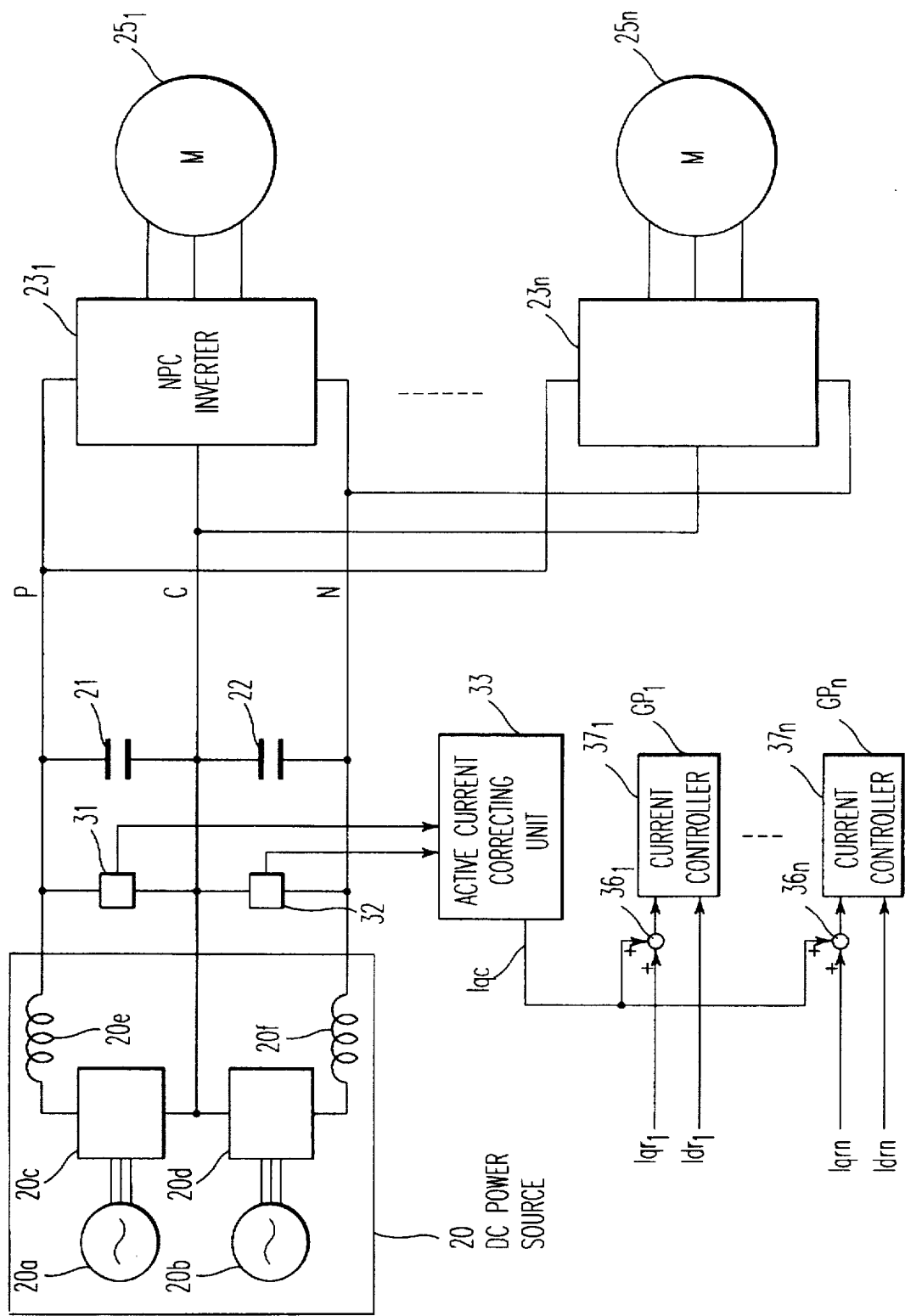
FIG. 6 is a block diagram showing an another embodiment of an another NPC inverter system of the present invention.

An embodiment of plural NPC inverter system of the present invention is shown in FIG. 6. Shown in this embodiment is a common power supply system to supply DC voltage having a neutral point C output from one DC power source 20 to a plurality of NPC inverters 231-23n and supply independent AC current to motors (loads) 251-27n.

In FIG. 6, 371-37n are control units to control NPC inverters 231-23n and motors (loads) 251-25n based on respective active (torque) current reference Iqr and reactive (exciting) current reference Idr and are provided with adders 361-36n to add correction signal Iqc to respective active current references Iqr1-Iqrn.

In the construction described above, if voltage between PN of the common DC power source fluctuates, correction signal Iqc in the high-frequency region with the low-frequency region including DC components below a prescribed frequency of the fluctuation components removed is added from active current correction unit 33 to torque current references Iqr1-Iqrn and active (torque) current components of AC current output from NPC inverters 231-23n are corrected and controlled to suppress voltage fluctuation between PN.

In case of this embodiment, NPC inverters 231-23n are able to operate independently, output different frequencies and therefore, DC voltage may fluctuate for the relation between respective frequency differences and LC resonance frequency of DC power source 20. This DC voltage fluctuation can be suppressed when time constant T of high-pass filter 35 of active current correction unit 33 is set at a proper value.

Figure 5B:
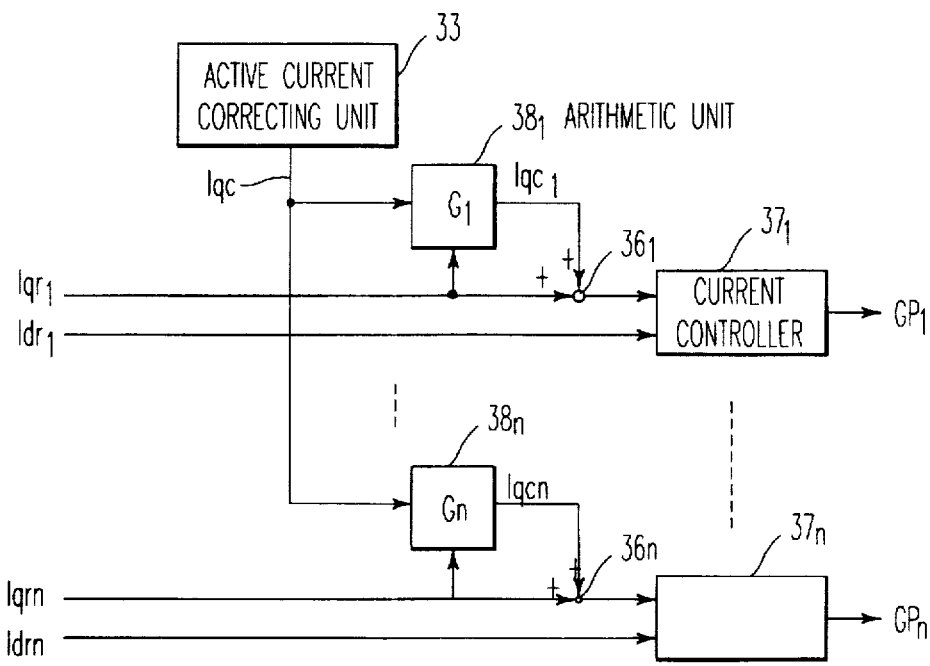

Another embodiment of an NPC inverter system of the present invention is shown in FIG. 5(b). This embodiment is the same as the embodiment shown in FIG. 6 but added with arithmetic units 381-38n.

These arithmetic units 381-38n are composed of amplifiers of which gains change according to active current references Iqr1-Iqrn, and output second correction signals Iqc1-Igcn multiplied by a gain that decreases in proportion to increase of active current references Iqr1-Iqrn against correction signal Iqc output from active current correction unit 33. Respective active current references that are given to respective current control means are corrected by this second correction signal so as to suppress DC voltage fluctuation.

Figure 5C:
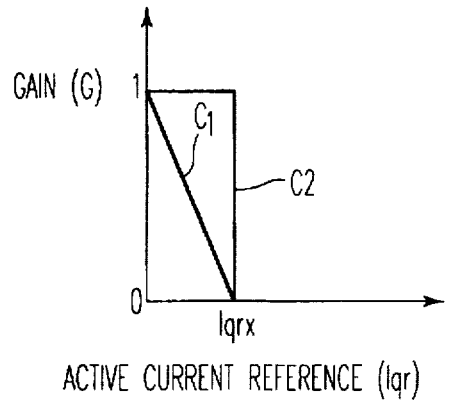

FIG. 5(c) is a gain characteristic of arithmetic units 381-38n and shows the relation of the change in gain against size (absolute value) of active current reference Iqr1-Iqrn.

Characteristic C1 is to reduce a gain of arithmetic units 381-38n according to increase in size (absolute value) of active current references Iqr1-Iqrn and makes the gain zero at prescribed active current reference Iqrx.

Characteristic C2 is to maintain a gain at a constant level when size (absolute value) of active current references Iqr1-Iqrn is below prescribed value Iqrx and make it zero when Iqrx is exceeded.

According to the these embodiment, when supplying AC current to motors (loads)251-25n by a plurality of NPC inverters 231-23n of the common power supply system, it is possible to suppress the fluctuating component of DC voltage by light loaded NPC inverters (including no loaded) by giving second correction signal Iqc to only NPC inverters that are supplying active current component below prescribed active current reference Iqrx and without giving second correction signal Iqc to NPC inverters that are supplying active current component above prescribed active current reference Iqrx. Therefore, when voltage fluctuation is suppressed if DC voltage is oscillated by the resonance of an LC filter of the DC power source, the correction and control are carried out by NPC inverters that have a surplus in output current without providing second correction signal Iqc to NPC inverters that are supplying AC current to a motor (load) that has a rolling load while observing the operating state of every NPC inverters and the rolling action is thus not adversely affected.

In the above description, an example to obtain DC voltage between PN of DC power source 20 by adding a detected value of positive side DC voltage Vdpf and a detected value of negative side DC voltage Vdnf is presented. DC voltage between PN also can be obtained similarly using a voltage detector to directly detect DC voltage between PN.

According to the present invention, it is possible to correct and control active current components of AC output current so as to suppress fluctuating voltage by detecting fluctuating component of DC voltage, to make DC voltage stable by suppressing an oscillating phenomenon of DC voltage resulting from LC resonance of DC power source and provide an NPC inverter system with the improved control characteristic.

Figure 7:
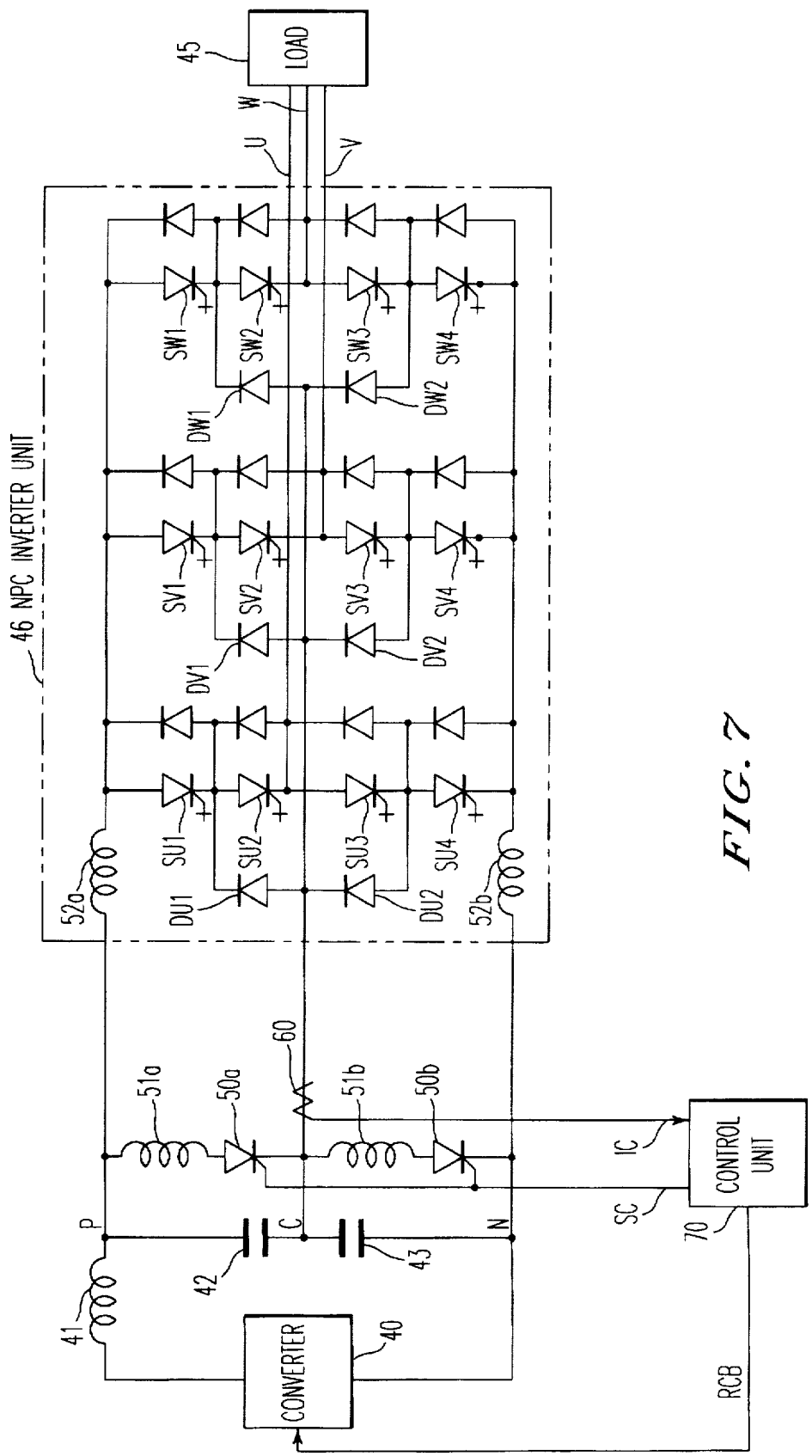
FIG. 7 is a block diagram showing an embodiment of an NPC inverter of the present invention.
Figure 12:
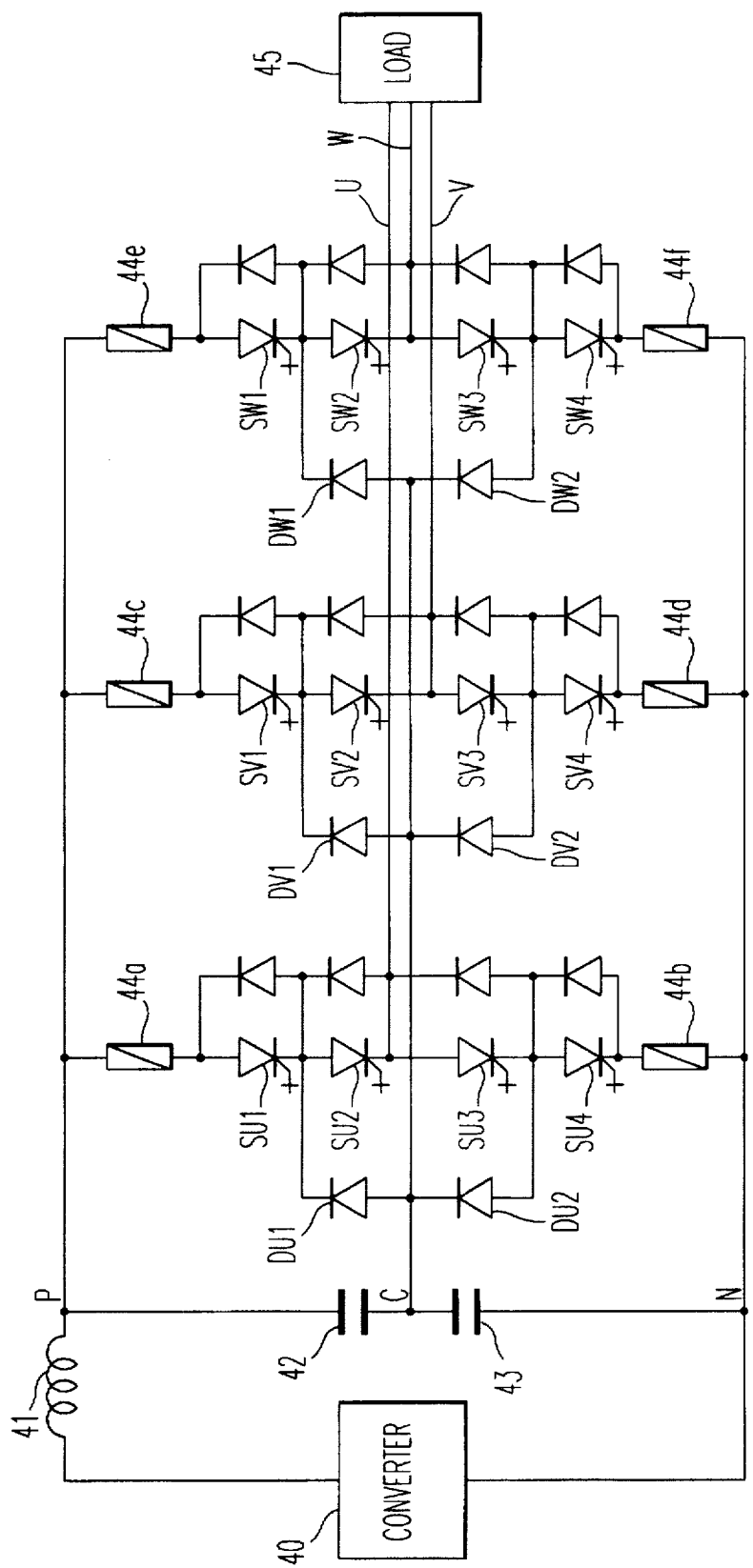
FIG. 12 is a block diagram showing a conventional NPC inverter.

An embodiment of the NPC inverter applicable to FIGS. 1, 4, and 6 of the present invention is shown in FIG. 7. In FIG. 7, 50a, 50b are short-circuit switching elements which are turned ON in response to a shortcircuit command Sc, 51a and 51b are reactors connected to capacitors 42, 43, 60 is a current transformer to detect instantaneous current flowing between neutral point C and an inverter unit 46, 70 is a control unit to output a short-circuit command Sc and a stop command RCB when detected current Ic exceeds a prescribed value. All others are the same component elements as a conventional NPC inverter (FIG. 12) and are assigned with the same reference numerals. Further, in this embodiment reactors 52a, 52b for limiting a change rate of current flowing to switching elements S1-S4 (Su1-Su4,Sv1-Sv4, Sw1-Sw4) connected in series are provided at the P and N sides of DC input of inverter unit 46. An NPC inverter may be in such construction that reactors may be connected in series to switching elements S1-S4 which are connected in series for all phases. In the construction described above, the instantaneous current flowing through neutral point C is detected by current transformer 60, and size (an absolute value) and polarity of this detected current Ic are constantly monitored by control unit 70. If the short-circuit current flows to the positive side or the negative side switching elements, the positive pole or the negative poles detecting current Ic in size proportional to the short-circuit current is output from current transformer 60 and if its size exceeds a prescribed value, control unit 70 outputs short-circuit command Sc to turn short-circuit switching element 50a or 50b ON. At the same time, the PWM control of inverter unit 46 is stopped and switching elements S1–S3 or S2–S4 in all phases are turned ON. Accordingly, the short-circuit current is branched to reactors 51a and 52a or reactors 51b and 52b, and the current flowing to a switching element in the phase generating the short-circuit is shared and reduced by the switching elements in all phases. As the branching ratio is decided according to an inductance ratio of reactors 51a and 52a or reactors 51b and 52b, it is possible to prevent and protect the switching elements from being damaged by deciding the inductance ratio of reactors so as to restrict the short-circuit current flowing to the positive or the negative side switching elements within the allowable current.

At the same time when outputting the short-circuit command Sc, control unit 70 also outputs the stop command RCB to stop the operation of converter 40 and therefore, most of the short-circuit current becomes discharge current of accumulated charge (energy) of capacitor 42 or 43. As this discharge current flows to the circuit of capacitor 42 and reactors 51a, 52a or the circuit of capacitor 43 and reactors 51b, 52b, it becomes an oscillation waveform current that is decided by its resonance frequency and the accumulated charge (energy) of capacitor 42 or 43 is moved to reactors 51a and 52a or reactors 51b and 52b as magnetic energy, the accumulated charge of that capacitor becomes zero, the discharge current becomes maximum and the magnetic energy also becomes maximum when voltage becomes zero. From this point of time, the discharge current generated by discharge of the magnetic energy continuously flows, capacitor 42 or 43 is charged to the reverse polarity, and when the magnetic energy becomes zero and the current becomes zero, short-circuit switching element 50a or 50b is turned OFF and at the same time, switching element of the inverter unit 46 kept ON is turned OFF. Further, at this point of time, the polarity of voltage of capacitor 42 or 43 is turned to the reversed state. Accordingly, from this point of time, the discharge current flows in the reverse direction from capacitor 42 or 43 through neutral point clamped diode D1 or D2 (Du1 or Du2, Dv1 or Dv2, Dw1 or Dw2)and a diode connected in reverse parallel to switching element S1 or S4 in each phase of inverter 46 and reactor 52a or 52b. In this case, the resonance frequency of the discharge circuit becomes a little low, the oscillation current becomes long in period with a high crest value and becomes zero after a half-period, and voltage at capacitor 42 or 43 is restored to the original polarity.

Figure 8:
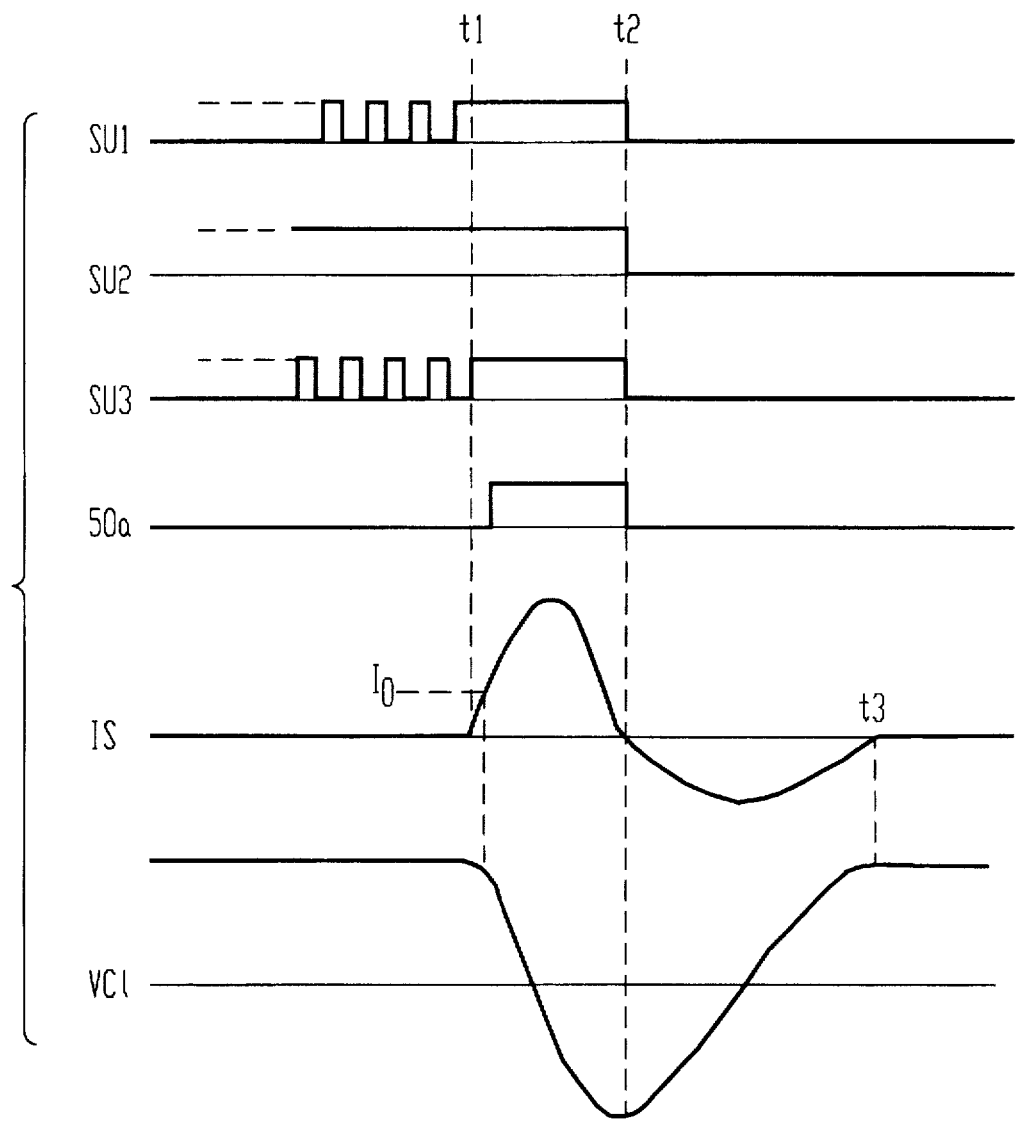
FIG. 8 is a time chart for explaining the operation of the embodiment of FIG. 7.

FIG. 8 shows an example of operation when a short-circuit trouble is generated at the positive side switching elements in U-phase of inverter unit 46. Now, if the PWM control is carried out as switching elements Su1 and Su3 are turned ON/OFF complimentarily in the state where switching element Su2 is kept ON and at the point of time t1, switching element Su3 is turned ON with switching element Su1 turned OFF from the ON state and switching element Su1 is failed to be turned OFF and switching element Su3 is turned ON, the circuit between P and C of the DC power source becomes short-circuited via reactor 52a, switching elements Su1, Su2, Su3 and neutral point clamped diode Du2, and discharge current Is flows out of capacitor 42 as the short-circuit current. This discharge current is detected as the positive polarity detecting current Ic by current transformer 60. If size (an absolute value) of this discharge current Is exceeds a prescribed current Io, control unit 70, judging the positive side arm to be in the short-circuited state from the polarity of the discharge current Is, outputs short-circuit command Sc to turn short-circuited switching element 50a ON and suspends the PWM control and turn switching elements Su1–Su3, Sv1–Sv3, Sw1–Sw3 in all phases ON. As a result, the discharge current is branched into reactors 51a and 52a and flows thereto as oscillation current and after the half period of the resonance period, the current becomes zero. At this point of time t2, short-circuited switching element 50a and switching elements Su1–Su3, Sv1–Sv3, Sw1–Sw3 in all phases are turned OFF. During the period to this point of time t1–t2, the polarity of voltage Vc1 of capacitor 42 is reversed. From the time t2, by the reversed voltage Vc1 of capacitor 42, discharge current is forced to flow in the reverse direction from capacitor 42 via neutral point clamped diode Du1, Dv1, Dw1 in all phases and the diode connected in reverse parallel with switching elements Su1, Sv1, Sw1 and reactor 52a. As this discharge current flows to only reactor 52a, the resonance frequency of the discharge circuit becomes a little low, the oscillation current becomes long in period with a low crest value and at the point of time t3 after a half period, the current becomes zero and voltage Vc1 of capacitor 42 is restored to the original polarity. In this case, the positive half period short-circuit current flows separately to switching elements Su1–Su3, Sv1–Sv3, Sw1–Sw3 and neutral point clamped diodes Du2, Dv2, Dw2 in all phases and it becomes thus possible to restrict the short-circuit current flowing to the switching elements within the allowable range, thereby protecting the switching elements by setting an inductance ratio of reactors 51a and 52a at a proper value.

When a short-circuit trouble is generated on the negative side switching elements in U-phase of inverter unit 46, the discharge current flows from capacitor 43 through neutral point clamped diodes Du1, Dv1, Dw1, switching elements Su2,–Su4, Sv2–Sv4, Sw2–Sw4 and reactor 52b, the negative polarity detection current Ic is detected from current transformer 60 and control unit 70 outputs short-circuit command Sc to turn short-circuited switching element 50b ON and thus, the protective operation is carried out in the same manner as described above.

Figure 9:
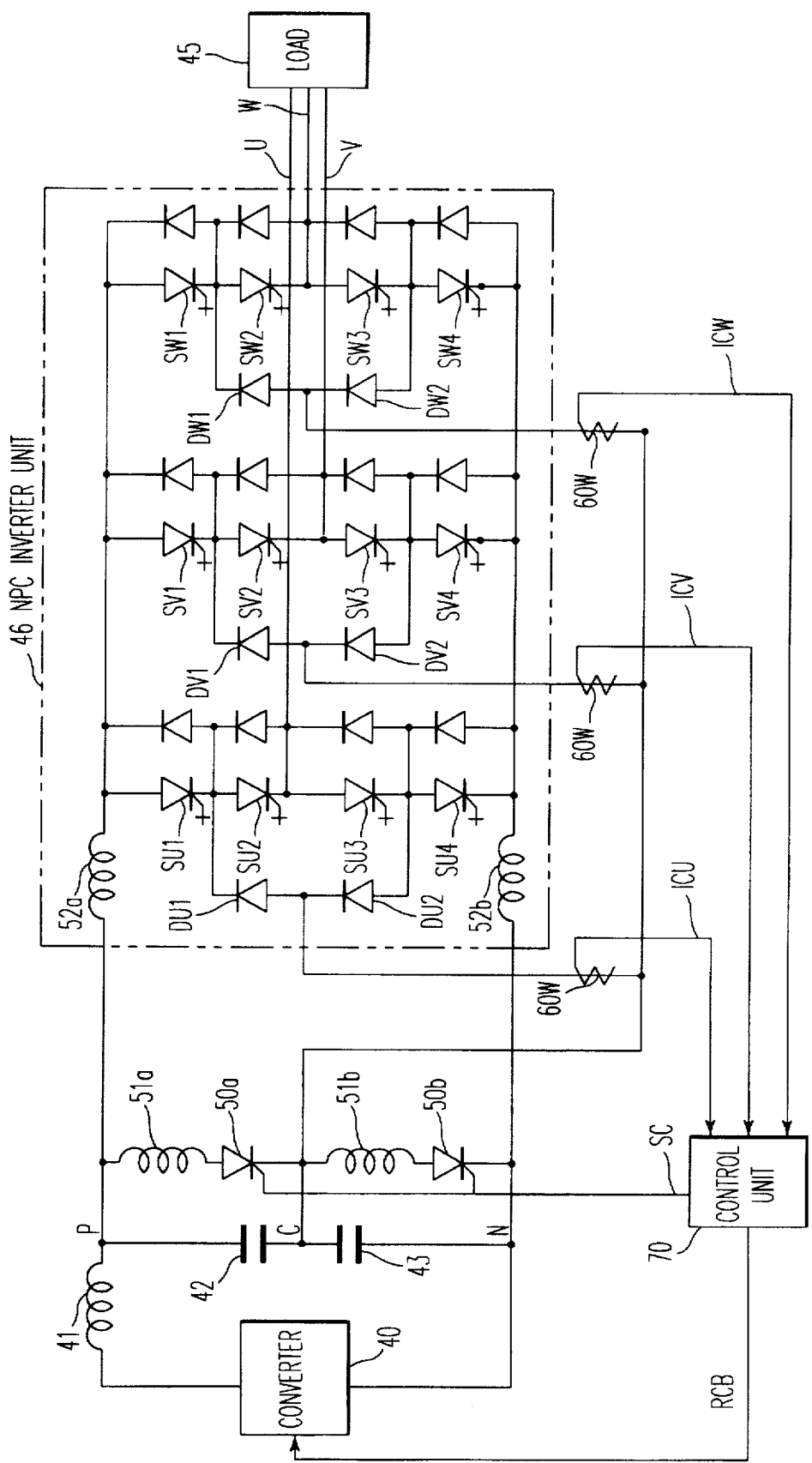
FIG. 9 is a block diagram showing an embodiment of an another NPC inverter of the present invention.

An another embodiment of the NPC inverter of the present invention is shown in FIG. 9. In this embodiment, current transformers 60u, 60v, 60w are provided to detect current flowing in/out of the neutral points for every U, V and W phases of inverter unit 46 and a function is provided to control unit 70 to detect and display a phase generating a short-circuit trouble from these detecting current Icu, Icv, Icw. In this embodiment, if a trouble is generated in any phase to cause a short-circuit between P and C or N and C of DC voltage, the short-circuit current flows to a current transformer in corresponding phase and the protective operation is carried out similar to that described above. Further, control unit 70 monitors the detection current Icu, Icv, Icw, discriminates a phase generated a short-circuit trouble from a detection current first exceeded a prescribed current Io and from the polarity of that detection current, discriminates and displays whether the short-circuited arm is the positive side or the negative side.

According to this embodiment, it becomes possible to easily detect a switching element generating a short-circuit trouble and improve the maintainability.

In the above embodiment, an example to perform the protective operation of an NPC inverter by detecting the neutral point current is described. It is also possible to perform this operation using a current detector to detect discharge current of capacitors 42, 43. Further, a short-circuited switching element is described using an example to operate either the positive polarity side or the negative polarity side. In such a case where the circuit between P and N is short-circuited, when operating both polarity side short-circuited switching elements using a current detector described above, they operate similarly and the same effect can be obtained.

Further, although an NPC inverter to obtain DC voltage having neutral points using two sets of capacitors connected in series and obtain AC voltage through PWM control of 3 level potentials is described in the above. the protective technique of this invention is also applicable to an inverter to obtain AC voltage by dividing in multi-stages of DC voltage between the positive pole P and neutral point C and between the negative pole N and neutral point C by 2 sets of capacitors connected in series and through the PWM control of multi-level potentials more than 3 levels.

According to the NPC inverter of the present invention, as it is possible to protect switching elements without using fuses for protecting them from short-circuit when a short-circuit trouble is taken place on an NPC inverter, the necessity for periodic fuse replacement is eliminated and it is possible to provide an NPC inverter system with easy maintenance, improved economical efficiency and promoted reliability for short-circuit protection.

What is claimed is:

1. A neutral point clamped (NPC) inverter control system composed of a DC power source to output DC voltage having a neutral point, and an NPC inverter having a PWM control means to convert the DC voltage into AC voltage characterized in that mode selecting means for comparing amplitude of a voltage reference with a predetermined value defined by a minimum pulse width and deciding a first and a second PWM modes in accordance with the compared result;

first voltage reference conversion means for adding a predetermined bias value defined by the minimum pulse width at which the polarity changes to positive/negative within a fixed period to secure the minimum pulse width to the voltage references in the first PWM mode;

second voltage reference conversion means for fixing the voltage reference in one phase by a value that secures the minimum pulse width when voltage reference in one phase is smaller than a predetermined value defined by the minimum pulse width references of other phases so as to make a line voltage to a value corresponding to the voltage reference; and modulation frequency change-over means for lowering a modulation frequency of the PWM control means in the first PWM mode.

2. The NPC inverter control system according to claim 1, wherein the mode selecting means decides a mode to be a first PWM mode when the amplitude of the voltage reference is less than a predetermined value decided by the minimum pulse width and a second mode when the amplitude of the voltage reference is a higher than the predetermined value, and has a hysteresis characteristic when changing over the mode.

3. A neutral point clamped (NPC) inverter control system composed of a DC power source to output DC voltage having a neutral point, and an NPC inverter having a PWM control means to convert the DC voltages into AC voltages characterized in that current control means for comparing active current reference and reactive current reference with detected values of active current component and reactive current component and controlling the NPC inverters so as to reduce current deviation; and correction means for outputting a fluctuating component in the region over a predetermined frequency of the DC voltage as a correction signal and correcting the active current reference so as to suppress fluctuation of the DC voltage by the correction signal.

4. A neutral point clamped (NPC) inverter control system composed of a DC power source to output DC voltage having a neutral point, and a plurality of NPC inverters to convert the DC voltages into AC voltages characterized in that a plurality of current control means for comparing active current reference and reactive current reference with detected values of active current component and reactive current component and controlling the NPC inverters so as to reduce current deviation; and correction means for outputting a fluctuating component in a region over a predetermined frequency of the DC voltage as a correction signal and correcting respective active current references so as to suppress fluctuation of the DC voltage by the correction signal.

5. The NPC inverter control system according to claim 4, wherein calculating means for providing a second correction signal that decreases in proportion to increase of active current reference based on the correction signal and the active current references, and correcting respective active current references by this second correction signal so as to suppress fluctuation of the DC voltage.

6. The NPC inverter control system according to claim 5, wherein the calculating means outputs the second correction signal that is the correction signal multiplied with a fixed gain until the active current reference exceeds a first predetermined value and make the second correction signal zero when the active current reference exceeded a second predetermined value.

7. A neutral point clamped (NPC) inverter control system composed of a DC power source with positive and negative poles to output DC voltage having a neutral point, and an NPC inverter having a neutral point connected to the positive and negative poles of the DC power source to convert the DC voltage into AC voltage characterized in that first and second branch means having a switching element provided between the positive and negative poles sides of the DC power source and the neutral point of the NPC inverter, and control means for turning the switching elements of the first and second branch means on when short-circuit current of the NPC inverter flow through the neutral point of the NPC inverter.

8. The NPC inverter control system according to claim 7, wherein selecting means for selectively turning on the switching element of either the first or the second branch means according to the direction of current flowing between the neutral point of the DC power source and the neutral point of the NPC inverter exceeds a predetermined value.

* * * * *